Aug. 25, 1964   S. A. MAJOR   3,145,434
WEATHERSTRIP ASSEMBLY
Filed May 4, 1961
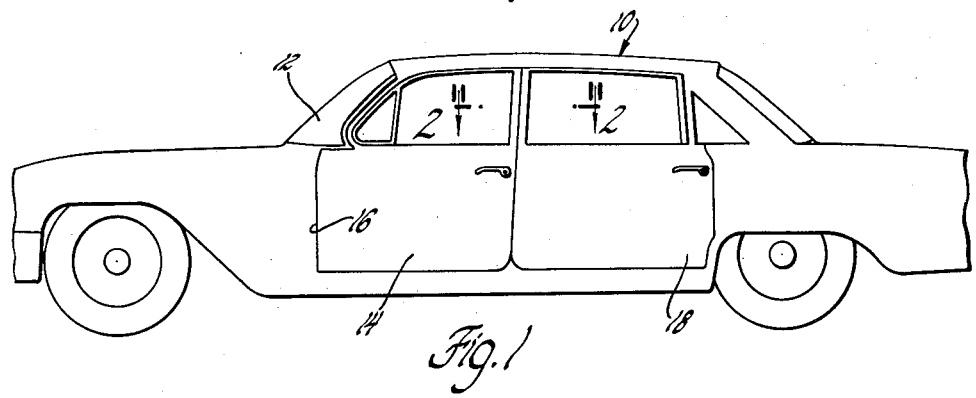
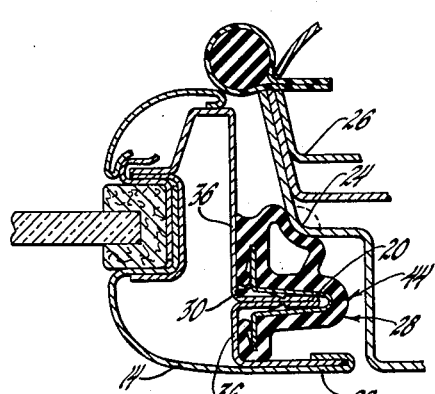
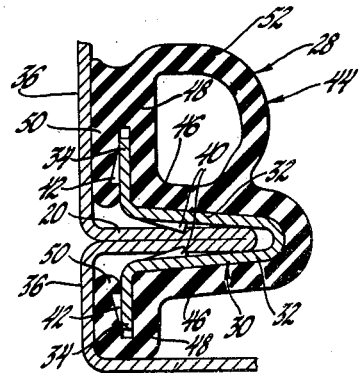
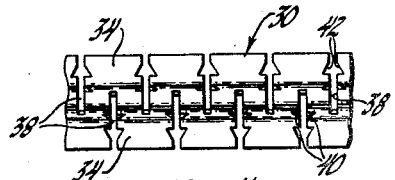
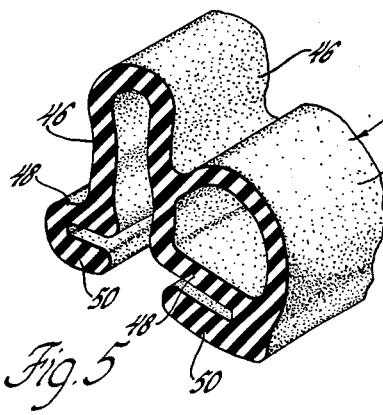
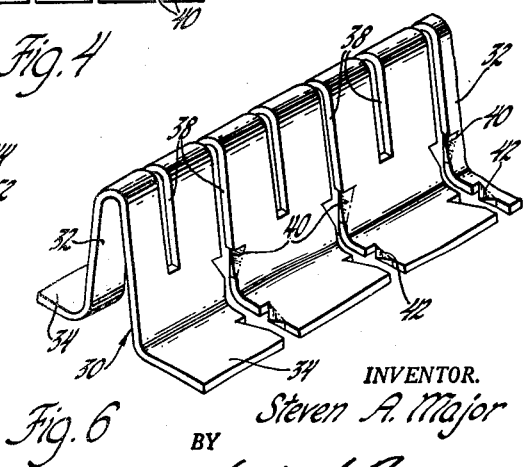
INVENTOR.
Steven A. Major
BY
Herbert Furman
ATTORNEY United States Patent Office 3,145,434
Patented Aug. 25, 1964

3,145,434
WEATHERSTRIP ASSEMBLY
Steven A. Major, Troy, Mich., assignor to General Motors Corporation, Detroit, Mich., a corporation of Delaware
Filed May 4, 1961, Ser. No. 107,706
2 Claims. (Cl. 20—69)

This invention relates to weatherstrip assemblies and more particularly to a weatherstrip assembly of the self-retaining type.

The weatherstrip assembly of this invention is particularly intended for use on vehicle bodies which include a mounting or support flange, such as a pinch weld flange, located on either the closure or the support for the closure. The assembly includes a generally U-shaped mounting member, the legs of which receive and clamp the support flange therebetween. A flange extends laterally from each leg, with each leg and respective flange being slotted and with the slots extending partially into the opposite leg so as to provide both lateral and longitudinal flexibility to the mounting member so that it can conform to support flanges of various shapes. A weatherstrip member is shaped to the mounting member, including a pair of legs bearing against the legs of the mounting member and a pair of U-shaped extensions which surround the flanges of the mounting member so that the lower flanges of these extensions can be clamped between the flanges of the mounting member and the support adjacent and to each side of the support flange. The edge portions of the slots in the mounting member are lanced and struck inwardly at each leg and its respective flange to provide pairs of tangs with the tangs on the mounting member legs gripping the support flange and the tangs on the mounting member flanges gripping the lower flanges of the weather strip extensions to thereby prevent these weatherstrip flanges from being pulled out from between the mounting member flanges and the support. A sealing membrane or lip interconnects one of the weatherstrip extensions and one of the legs thereof and is adapted to bear against an adjacent surface to provide a compressible type seal when the closure is in closed position.

The weatherstrip assembly of this invention is very simple and economical and can be easily made. The mounting member may be made from strip stock which is first slotted and lanced to provide the tangs and may then be rolled into the appropriate shape. The weatherstrip member may be easily extruded in a continuous type operation and the two members may be assembled prior to the mounting of the assembly on the support flange. No tools, adhesives, or otherwise are needed for mounting of the assembly, since the assembly is easily mounted on the support flange by positioning the legs of the mounting member to each side of the flange and then pushing the assembly toward the support to insert the flange between the legs and to also clamp the lower flanges of the weatherstrip extensions against the support.

The primary object of this invention is to provide an improved weatherstrip assembly. Another object of this invention is to provide an improved weatherstrip assembly of the self-retaining type. A further object of this invention is to provide an improved weatherstrip assembly which includes a mounting member and a weatherstrip member which may be preassembled prior to the mounting of the weatherstrip assembly on a flange of a support.

These and other objects of the invention will be readily apparent from the following specification and drawings, wherein:

FIGURE 1 is a partial side elevational view of a vehicle body including a closure member adapted to be sealed in the closed position thereof by a weatherstrip assembly according to this invention;

FIGURE 2 is an enlarged sectional view taken generally along a portion of the plane indicated by line 2—2, FIGURE 1;

FIGURE 3 is an enlarged view of a portion of FIGURE 2;

FIG. 4 is a plan view of the mounting member;

FIGURE 5 is a perspective view of the weatherstrip member; and

FIGURE 6 is a perspective view of the mounting member.

Referring now particularly to FIGURE 1 of the drawings, a vehicle body 10 includes a windshield 12 and a front door 14 which is suitably hinged to the body 10 adjacent the forward edge 16 of the door for swinging movement between a closed position, as shown, and an open position, not shown. Door 16 is sealed in its closed position by a weatherstrip assembly according to this invention. Body 10 also includes a rear door 18 which may be similarly mounted on the body 10 for movement between open and closed positions and which may also be sealed in its closed position by the weatherstrip assembly of this invention.

As shown in FIGURES 2 and 3 of the drawings, the front door 14 includes a support or pinch weld flange 20 located intermediate the inner and outer walls of the door and further located in inwardly spaced relationship to an outer hem flange 22 of the door. Located inwardly of the flange 20 is a shoulder 24 of a body pillar 26. A weatherstrip assembly 28 according to this invention is mounted on each of the flanges 20 and seals against the shoulders 24 in the closed position of the door.

The weatherstrip assembly 28 includes a backing or mounting member 30 of generally U-shaped cross section and including legs 32 which define a channel adapted to receive a flange 20 in the mounted position of the assembly as shown in FIGURE 3. A flange 34 extends laterally from each of the legs of the mounting member, with this flange adapted to be located in generally parallel spaced juxtaposed relationship to the portions 36 to each side of the flanges 20 in the mounted position of the weatherstrip assembly. Each leg and its respective flange is slotted at 38, with the slots 38 alternating with each other and extending over the bight of the mounting member and partially into the opposite leg as can be seen in FIGURE 4. This slotting provides for both lateral and longitudinal flexibility of the mounting member so that it can be bent laterally and longitudinally into various shapes to provide for widespread usefulness regardless of the general shape of the support flange 20, which may not be linear in all instances. Spaced pairs of tangs 40 and 42 are struck from the edge portions of the slots 38 at the legs 32 and the respective flanges 34 of these legs. The tangs 40 on the legs are adapted to grip and bite into the flange 20 to self-retain the assembly on the flange 20 as shown in FIGURE 3.

The weatherstrip member 44 is shown in FIGURE 3 and conforms generally to the shape of the mounting member, including legs 46 which are respective to the legs 32 of the mounting member, with each leg 46 including an integral, inwardly opening U-shaped extension receiving a flange 34 and having an upper leg or flange 48 adapted to bear against the upper or outer surface of the legs 34 and a lower leg or flange 50 adapted to bear against the lower surface of the legs 34 and to be clamped between the legs 34 and the portions 36 in the mounted position of the assembly. The tangs 42 on the legs 34 of the mounting member bite into the flanges 50 of the weatherstrip member to prevent the flanges 50 from being pulled out from between the legs 34 and portions 36. Further, the tangs 42 and flanges 50 provide for assembly of the mounting member 30 and weatherstrip member 34 as a unit prior to any mounting of the assembly on the body. A sealing membrane or lip 52 extends between one of the legs 46, adjacent the bight of the weatherstrip member, and one of the U-shaped extensions of the weatherstrip member and is adapted to be partially compressed or deformed in the closed position of the door so as to seal the shoulder 24 of the body pillar to either the door 14 or 18 in the closed position of the latter.

After assembly of the weatherstrip member 44 to the mounting member 30, the assembly may be easily mounted on the body by locating the legs 32 to each side of the flange 20 and thereafter pushing the assembly toward the portions 36 of the door to insert the flange 20 between the legs 32 and to also clamp the flanges 50 against the portions 36. Thus, the assembly is self-retained on its support and no tools or adhesives are necessary in order to mount the assembly on its support. It will be noted that the legs 34 are of unequal depth and that the respective extensions of member 44 are correspondingly shaped. This difference results from the depth of the one extension of member 44 necessary to provide a membrane 52 of sufficient extent and flexibility.

Thus, this invention provides a new and improved weatherstrip assembly.

What is claimed is:

1. A weatherstrip assembly adapted to be mounted on a support having flange structure extending laterally thereto comprising, in combination, a generally U-shaped mounting member receiving said flange structure therewithin, said member including a flange extending laterally from one leg thereof and located generally laterally to said flange structure and in spaced juxtaposed relationship to said support, said leg and said mounting member flange being slotted, tangs struck from the edge portions of said slots at said mounting member flange, a weatherstrip member surrounding said mounting member and including interconnected flanges receiving said mounting member flange therebetween, one of said weatherstrip flanges being located between said mounting member flange and said support and being clamped therebetween, said tangs on said mounting member flange engaging said one weatherstrip flange to prevent said weatherstrip flange from being pulled out from between said mounting member flange and said support.

2. A weatherstrip assembly adapted to be mounted on a support having flange structure extending laterally thereto comprising, in combination, a generally U-shaped mounting member including a pair of legs receiving said flange structure therewithin, said member including a flange extending laterally from each leg thereof and located generally laterally to said flange structure and in spaced juxtaposed relationship to said support, said legs and said mounting member flanges being slotted, tangs struck from the edge portions of said slots at said legs and said mounting member flanges, said leg tangs engaging said support flange structure, a weatherstrip member surrounding said mounting member and including pairs of interconnected flanges, each pair being respective to and receiving a mounting member flange therebetween, one of said weatherstrip flanges of each pair being located between a respective mounting member flange and said support and being clamped therebetween, said tangs on said mounting member flanges engaging said one weatherstrip flanges to prevent said one weatherstrip flanges from being pulled out from between said mounting member flanges and said support.

References Cited in the file of this patent

UNITED STATES PATENTS

| 2,693,011 | Fernberg | Nov. 2, 1954 |
| 2,699,581 | Schlegel | Jan. 18, 1955 |
| 2,702,415 | Wagner | Feb. 22, 1955 |
| 2,746,103 | Bright | May 22, 1956 |
| 2,974,383 | Bright | Mar. 14, 1961 |
| 2,986,793 | Bright | June 6, 1961 |

FOREIGN PATENTS

| 803,142 | Great Britain | Oct. 22, 1958 |